United States Patent [19]

Abe

[11] 4,136,939
[45] Jan. 30, 1979

[54] RANGEFINDING OPTICAL SYSTEM

[75] Inventor: Masao Abe, Tokyo, Japan

[73] Assignee: Nihon Beru-Haueru Kabushiki Kaisha (Bell & Howell Japan, Ltd.), Higashimurayama, Japan

[21] Appl. No.: 838,610

[22] Filed: Oct. 3, 1977

[30] Foreign Application Priority Data

Oct. 8, 1976 [JP] Japan .................................. 51-121110

[51] Int. Cl.² ......................... G03B 7/08; G03B 13/10; G03B 13/02
[52] U.S. Cl. ...................................... 354/25; 354/199; 354/222
[58] Field of Search .................. 250/201; 354/25, 163, 354/166, 199, 219, 222, 224, 225

[56] References Cited

U.S. PATENT DOCUMENTS

| 3,194,139 | 7/1965 | Babcock .............................. 354/199 |
| 3,260,184 | 7/1966 | Pagel et al. ....................... 354/222 X |
| 4,002,899 | 1/1977 | Stauffer ............................. 354/25 X |

FOREIGN PATENT DOCUMENTS

| 969453 | 6/1958 | Fed. Rep. of Germany ........... 354/166 |
| 668673 | 3/1952 | United Kingdom ..................... 354/222 |

Primary Examiner—Donald A. Griffin
Attorney, Agent, or Firm—Aaron Passman; Roger M. Fitz-Gerald

[57] ABSTRACT

An automatic rangefinding optical system for a camera includes optics connected for movement subject to the operative zooming main lens. The rangefinding system has an automatic focusing device which generates a pulse when separate objective images from two optical system paths coincide. Zooming the rangefinder along the two optical system paths gives more precise automatic focusing of the subject by optically modifying the objective images according to the zoom position of the main lens.

14 Claims, 3 Drawing Figures

RANGEFINDING OPTICAL SYSTEM

BACKGROUND OF THE INVENTION

This invention relates to automatic rangefinders of the type generally described in U.S. Pat. No. 4,002,899 assigned to Honeywell, Inc. Such automatic rangefinders and focusing systems include two optical system paths that bring light from the subject to an optical detector. Such optical detectors are photosensitive devices and as such respond to the fact that both optical systems are aligned with one another and are directed toward the same subject. This alignment is called coincidence and generates a pulse from the optical detector which can be used to adjust the focus of the main camera lens.

In using such automatic rangefinding optical devices with a main lens which has the capacity for zooming, difficulties arise in that a plurality of subjects within the depth of field tend to confuse the automatic focusing by introduction of simultaneous signals particularly during zooming of the main lens. In the instance where two subjects are in the field of view and one subject is closer than the other the zoom lens in its telephoto position will be out of focus because the automatic rangefinding devices tend to detect both subjects and cannot rapidly accommodate a zooming change. It is an object of this invention to overcome the aforesaid problem and to detect the subject and focus precisely by varying the objective images which are brought along the optical system paths to the automatic rangefinder in accordance with the variation of the main objective image brought along the optical axis through the zoom lens to the image plane of the camera.

SUMMARY OF THE INVENTION

To correct for zooming of the main lens and minimize the effects on the optical system paths of the automatic rangefinding device, adjustable optics are added between the subject and the photo detector. The adjustable optics are included in each of the paths and consist of a pair of lenses, one of which is a movable bi-concave lens and the other a fixed bi-convex lens. The image is brought first to the movable bi-concave lens and then to the fixed bi-convex lens. The distance between the bi-concave and bi-convex lens is adjusted according to the position of zooming of the main zoom lens. When the main zoom lens is in the wide angle position the distance between the bi-concave and bi-convex lenses is greatest. Conversely, when the main lens is in the telephoto position, the distance is at its minimum. Movement of the bi-concave lens toward the bi-convex lens tends to magnify the image brought to the photo detector. The correcting optics herein essentially accommodate the difference in the width of the picture format by adjusting the images brought to the photo detector. If correction is not made, then the image when brought from wide angle to telephoto will not be automatically focused because the prior art rangefinders detect only a central part of the scene and could not adequately account for closeup zoom photography. Three linkages are shown for coupled movement of the bi-concave lenses disposed along the optical system paths. The biconcave lenses can only move in unison along their respective optical paths linearly toward or away from their respective bi-convex lenses. That is to say, that there are two sets of optics each with a movable element for modifying the image of the subject along the paths for the photo detector.

DETAILED DESCRIPTION OF THE DRAWINGS

Figure 1:
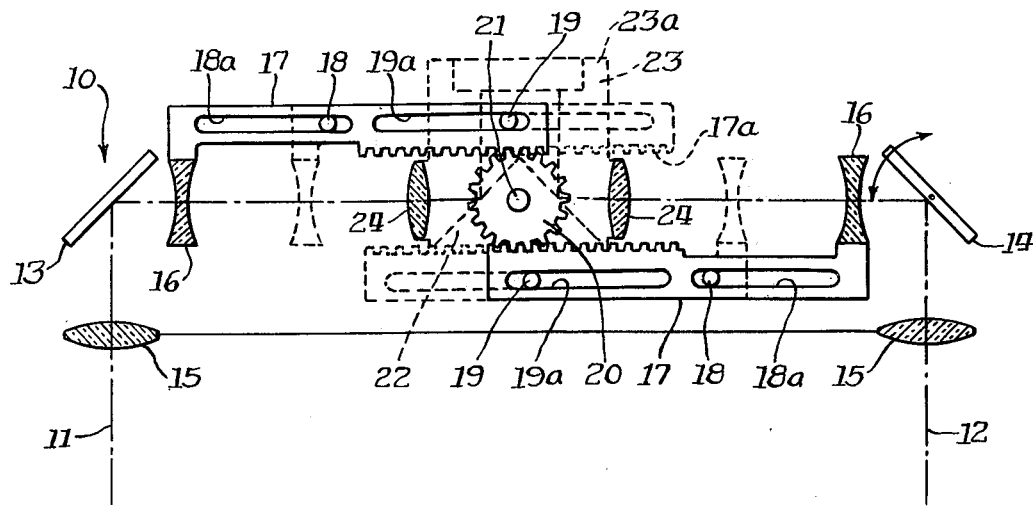
FIG. 1 shows a generally schematic presentation of the automatic rangefinding optical system which includes a rack and pinion linkage for unified movement of each bi-concave lenses lens toward or away from its respective fixed bi-convex lens.

In FIG. 1 there is shown an automatic rangefinding optical system generally designated 10. The system includes two optical paths 11 and 12. Paths 11 and 12 extend from the subject not shown to a photosensitive device 23. Path 11 is fixed relative to the main lens of the camera and path 12 is a scanning path movable relative to the main lens and path 11. Path 12 includes an oscillating mirror 14 which substantially aligns path 12 with detector 23 and which in a well known manner permits path 12 to scan a part of the field of the picture format. When the optical paths 11 and 12 are aligned upon the same subject, the images which reach the photosensitive detector 23 coincide. That coincidence reinforces the signal emanating from detector 23 and is used to adjust the focus. Along path 11 there is a fixed mirror 13 used to divert the path 11 for eventual alignment with the photo detector 23. Mirror 13 corresponds to mirror 14 in every respect except that mirror 13 does not oscillate. The mirrors 13 and 14 are opposite one another and positioned first to bend paths 11 and 12 respectively toward a prism 22 for further deflection. The faces of prism 22 further reflect paths 11 and 12 toward photo detector 23.

Interposed between mirrors 13 and 14 are optics. These optics are added to make the automatic rangefinding optical system 10 responsive to the position of the main lens (not shown) during zooming. The main lens is capable of zooming from a wide angle position to a telephoto position. In zooming the subject is magnified with respect to the image plane in the camera. That is to say, that pictures taken with the lens in the wide angle position cause the subject to appear small and far away, whereas pictures taken with the lens in the telephoto position cause the subject to appear relatively large and close. This change in subject size is accounted for in the automatic rangefinder by optics applied between mirrors 13 and 14 and their respective prism surfaces 22.

Figure 2:
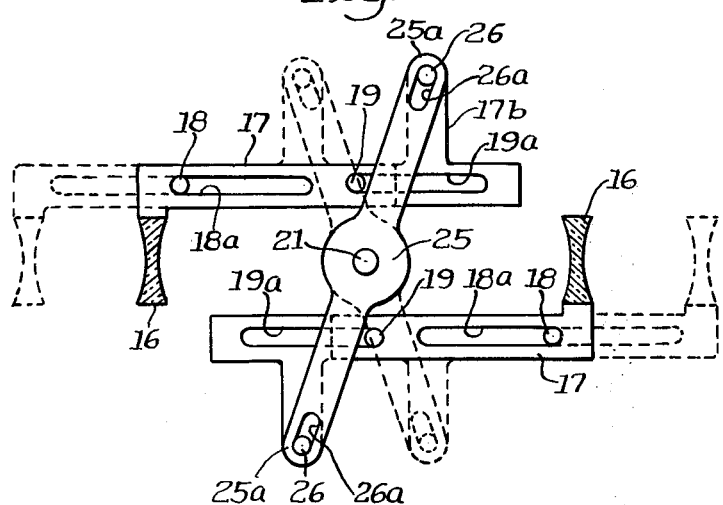
FIG. 2 shows a schematic presentation of a crank and slider mechanism for unified movement of each bi-concave lens toward or away from its respective fixed bi-convex lens.
Figure 3:
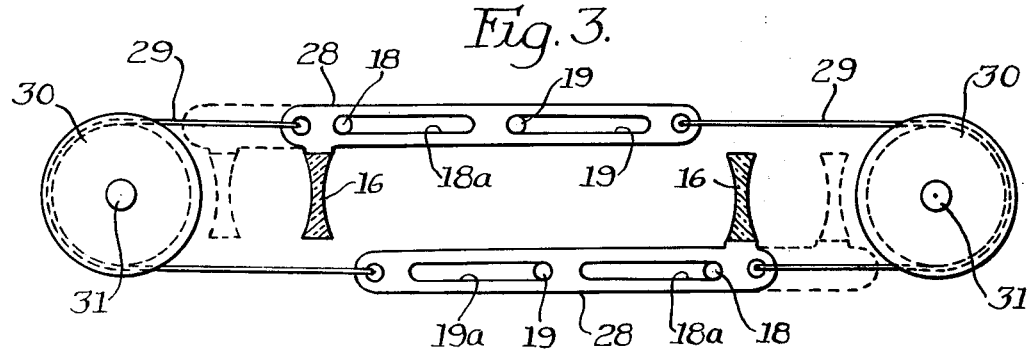
FIG. 3, also schematic, shows a pulley and wire system for coupled movement of each bi-concave lens for unified movement toward or away from its respective fixed bi-convex lens.

The optics include a pair of movable bi-concave lenses 16 and a pair of fixed convex lenses 24. Both sets of lenses 16 and 24 are axially centered on a line formed by their respective optical paths 11 or 12. Each bi-concave lens 16 is movable along its respective optical path 11 or 12 toward and away from its respective fixed bi-convex lens 24. The optics and their support structures are symmetrical about horizontal and vertical lines such that both optical paths 11 and 12 include equivalent components for their moving optics, which components are opposite to one another. The systems shown in FIGS. 1, 2 and 3 are similar in that the bi-concave lenses 16 are coupled by a common linkage for movement in equal amounts toward and away from each other. The differences between FIGS. 1, 2 and 3 are in the particular linkage adapted to move the bi-concave lenses 16. FIGS. 1, 2 and 3 all have support pins 18 and 19 which are rigidly supported by the camera. These pins 18 and 19 align with slots 18a and 19a respectively in each of the various linkages. Similarly, FIGS. 1 and 2 are driven by a centered drive pin 21 whereas the linkage of FIG. 3 can be driven from either side by either drive 31.

In FIG. 1 a rack and pinion mechanism for the automatic rangefinding optical system 10 is disclosed. On fixed pins 18 and 19 rides a sliding support link 17 having elongated slots 18a and 19a respectively. Disposed on one edge of link 17 are a series of gear teeth 17a which form the rack. Link 17 is only permitted to move linearly with respect to the fixed pins 18 and 19 such that slots 18a and 19a slide over pins 18 and 19. Since there are two paths for the imaging of the rangefinder optical system there must be two links 17 with racks 17a disposed at opposite ends of each other in the mechanism such that one rack 17a supports a bi-concave lens 16 between mirror 13 and the photo detector 23 and the other rack 17a supports the other bi-concave lens 16 between mirror 14 and the photo detector 23. The opposed links 17 of the two racks 17a are driven by a common pinion 20. Thus, when pinion 20 is turned by pinion drive 21 at the center thereof links 17 are driven in opposite directions from one another, i.e., toward or away from one another depending upon the direction of rotation clockwise or counterclockwise respectively of pinion 20. The linear support of links 17 on pins 18 and 19 assures that bi-concave lenses 16 move axially along the optical paths 11 and 12 of the automatic rangefinder. Between the lenses 16 and the photo detector 23 are bi-convex lenses 24 which do not move being fixed to the sides of the support 23a for the photo detector 23. The movement of lenses 16 relative to lenses 24 acts to magnify the image as each lens 16 moves towards its respective lens 24. There is a prism 22 positioned within support 23a and arranged to deflect the light path entering the support 23a toward the photo detector 23.

Each movable bi-concave lens 16 in cooperation with its fixed bi-convex lens 24 forms the optics which accommodate the zooming of the main camera lens (not shown) because the drive 21 for pinion 20 is connected to the zooming control for the main lens. While the effect of the zooming on the picture image is not identical to the effect on the image for the rangefinder the correlation is adequate to correct any problems in the angle of the picture format vis-a-vis the rangefinder image format when the lens is zooming from wide angle to telephoto or vice versa.

FIG. 2 shows a similar arrangement for coordinated coupled movement of bi-concave lenses 16. However, the rack and pinion mechanism is replaced by a crank and slider drive. The parts which are similar in function and design in FIGS. 1, 2 and 3 have common number designations and their operation will not be explained further except to the extent that it is different from what has preceded. In lieu of the rack and pinion mechanism, in FIG. 2 there is a centrally disposed double ended crank 25 each end of which has an arm 25a which includes an elongated slot 26a. Each slot 26a rides on a pin 26 and each pin 26 is supported on an extended tab 17b on each link 17. Rotation of crank 25 causes its arms 25a to push the pins 26 from one side to the other depending upon the direction of rotation. Slots 26a are elongated to accommodate the arcuate movement of arms 25a and to permit links 17 to move linearly with respect to pins 18 and 19. The double ended nature of crank 25 is such that a pair of links 17 may be driven in unison and in opposite directions at the same time because arms 25a extend in opposite directions from the center of crank 25. Clockwise rotation of crank 25 causes the bi-concave lenses 16 to come together. Counterclockwise rotation of crank 25 does the reverse.

FIG. 3 shows a slightly different arrangement in that a pair of pulleys 30 are positioned at opposite ends of the mechanism which drives the bi-concave lenses 16. The pulleys 30 act to move a pair of oppositely disposed parallel links 28 which are similar to links 17 in that they include the elongated slots 18a and 19a for fixed pins 18 and 19. Links 28 are different in that they are driven by pulley wires 29 which wrap about pulleys 30 and extends from the end of one link 28 to the end of the opposite link 28. Links 28 support bi-concave lenses 16 such that they are axially centered along the optical paths for their respective optical systems. Pulleys 30 are at opposite ends of the mechanism and are supported on pulley drives 31. The mechanism can be driven from either drive 31 or simultaneously from both drives 31. In certain applications the coupling of a side drive 31 to the main camera lens (not shown) is more convenient and/or appropriate than the center drive 21 shown in FIGS. 1 and 2. Rotation of one pulley 30 results in the equivalent rotary motion of the opposite pulley 30 because the combination of the wires 29 and the intermediately disposed links 28 forms therebetween a complete connection.

As those skilled in the art will no doubt appreciate many refinements, corrections and modifications may be made to disclosure herein of the basic optics and mechanism for moving the optics. Such variations are therefore contemplated in the appended claims which cover the true spirit and scope of the present invention.

It is claimed:

1. A supplementary optical system for an automatic rangefinder camera with an adjustable main lens comprising:
   a pair of optical systems defining two paths from a subject to at least one photosensitive surface;
   a pair of mirrors positioned within said paths of the said optical systems for providing a reference image and a scanned image for focusing:
   a pair of lens elements disposed along each of said paths between each of said mirrors and said photosensitive surface for optically modifying the image of the subject transmitted to said surface;
   a pair of support means operatively connected to each of said pair of lens elements for movement of at least one of said elements axially along each of the respective paths; and
   coupling means between said support means and the main lens of the camera for providing controlled relative axial motion of said support means as said main lens is moved to modify the image of the subject transmitted to said surface in accordance with the adjusted position of the main lens.

2. The system of claim 1 wherein each said element includes one fixed lens and one movable lens mounted and centered axially with respect to one of said paths.

3. The system of claim 2 wherein each of said fixed lenses is closer to said surface and each of said movable lenses is nearer said mirror.

4. The system of claim 3 wherein each of said fixed lenses is a bi-convex lens.

5. The system of claim 4 wherein each of said movable lenses is a bi-concave lens.

6. The system of claim 5 wherein each of said bi-concave lenses moves toward each of said bi-convex lenses as the main lens is adjusted from its wide angle position to its telephoto position to thereby magnify the subject image before it reaches said surface.

7. The system of claim 1 wherein said pair of support means includes a member supported for linear movement within a plane and engaging means associated therewith for drivingly cooperating with said coupling means.

8. The system of claim 7 wherein said members are a pair of parallel links each of which includes a pair of elongated axial slots which ride on pins fixed to the camera so that said links are only permitted to move linearly within a plane and parallel to each other.

9. The system of claim 8 wherein said engaging means is a linear rack type gear positioned along a longer edge of said link.

10. The system of claim 9 wherein said coupling means is a pinion operatively connected to the main lens of the camera whereby adjustment of the main lens causes said pinion to be rotated accordingly.

11. The system of claim 8 wherein said engaging means are protruding pins mounted in offset relationship to the center line of said links and the axis of said pins extends normally.

12. The system of claim 11 wherein said coupling means is a double ended crank having oppositely extending arms which include elongated slots for operative connection and engagement with said pins on said links whereby adjustment of the main lens causes said crank arms to be rotated accordingly for movement of said pins within said slots.

13. The system of claim 8 wherein said engaging means includes a pair of wires drivingly connected to the opposite ends of said links for controlled axial displacement of said links whereby movement in one direction of one of said wires generates an equal and opposite movement by the other of said wires.

14. The system of claim 13 wherein said coupling means are a pair of oppositely disposed pulleys rotatably mounted for supporting said wires in a plane between said links so that adjustment of the main lens causes at least one of said pulleys to be rotated accordingly.

* * * * *